(12) United States Patent
Schmauder et al.

(10) Patent No.: US 10,814,432 B2
(45) Date of Patent: Oct. 27, 2020

(54) UNLOADING A CUT-FREE WORKPIECE PART DURING MACHINING

(71) Applicant: TRUMPF Werkzeugmaschinen GmbH + Co. KG, Ditzingen (DE)

(72) Inventors: Frank Schmauder, Metzingen (DE); Dieter Pfisterer, Tamm (DE); Jochen Bellon, Renningen (DE); Harald Mathias, Boenningheim (DE); Bernd Renz, Benningen am Neckar (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 356 days.

(21) Appl. No.: 15/840,925

(22) Filed: Dec. 13, 2017

(65) Prior Publication Data
US 2018/0099359 A1 Apr. 12, 2018

Related U.S. Application Data

(63) Continuation of application No. PCT/EP2016/062856, filed on Jun. 7, 2016.

(30) Foreign Application Priority Data

Jun. 16, 2015 (DE) .......... 10 2015 211 017

(51) Int. Cl.
*B23K 26/38* (2014.01)
*B23K 26/08* (2014.01)
(Continued)

(52) U.S. Cl.
CPC ............ *B23K 26/38* (2013.01); *B23K 26/083* (2013.01); *B23K 26/0853* (2013.01);
(Continued)

(58) Field of Classification Search
CPC .... B23K 26/38; B23K 26/702; B23K 26/083; B23K 26/0853; B23K 26/0869;
(Continued)

(56) References Cited

U.S. PATENT DOCUMENTS 4,046,985 A * 9/1977 Gates .................. G03F 9/70
219/121.82
5,049,723 A * 9/1991 Macdonald .......... B23K 9/0956
219/121.67

(Continued)

FOREIGN PATENT DOCUMENTS

| CN | 1044248 | 8/1990 |
|---|---|---|
| CN | 2832422 | 11/2006 |

(Continued)

OTHER PUBLICATIONS

"Lifting System for Loading Metal Sheet & Plate onto Laser Cutting Table", uploaded on Nov. 23, 2017 by user "Engineered Lifting Systems". Retrieved from Internet: <https://www.youtube.com/watch?v=NY7Cz0r_Wpo>. (Year: 2017).*

(Continued)

*Primary Examiner* — Jimmy Chou
(74) *Attorney, Agent, or Firm* — Fish & Richardson P.C.

(57) ABSTRACT

In the method according to the disclosure for the unloading of a workpiece part from a workpiece, in parallel with processing time, by means of an unloading element, e.g. a vacuum sucker, the workpiece part is cut from an especially plate-form workpiece by means of a laser beam. The movement of the laser beam relative to the workpiece at least along a first movement axis (X) is divided into a movement of the workpiece and a movement of the laser beam. Before executing a final cut, which separates the workpiece part from the workpiece, the workpiece is decelerated until standstill and the final cut is then executed for example, by moving the laser beam. The workpiece part is being (Continued)

unloaded by an unloading element that operates at least partially during cutting of the workpiece. The unloading element operates according to one of three operating options.

17 Claims, 5 Drawing Sheets

(51) Int. Cl.
    *B23K 26/70*     (2014.01)
    *B23K 37/04*     (2006.01)
    *B23K 101/18*    (2006.01)
    *B23Q 3/08*     (2006.01)
    *B23Q 15/013*    (2006.01)
(52) U.S. Cl.
    CPC ........ *B23K 26/0869* (2013.01); *B23K 26/702* (2015.10); *B23K 37/0408* (2013.01); *B23K 2101/18* (2018.08); *B23Q 3/088* (2013.01); *B23Q 15/013* (2013.01)
(58) Field of Classification Search
    CPC ............ B23K 37/0408; B23K 2101/18; B23Q 3/088; B23Q 15/013
    USPC .......................... 219/121.72, 121.63, 121.85
    See application file for complete search history.

(56) References Cited

U.S. PATENT DOCUMENTS

| | | | |
|---|---|---|---|
| 5,481,083 A * | 1/1996 | Smyth, Jr. ......... | B23K 26/0838 219/121.67 |
| 5,648,002 A * | 7/1997 | Omote ............... | B23K 26/0838 219/121.82 |
| 5,813,826 A * | 9/1998 | Martin ................ | B65G 57/005 271/9.07 |
| 6,006,638 A * | 12/1999 | Eltringham ........... | B21D 43/20 271/18.1 |
| 6,055,895 A * | 5/2000 | Kanazawa ............. | B21D 43/18 414/752.1 |
| 6,062,799 A * | 5/2000 | Han ..................... | H05K 7/1415 198/409 |
| 6,264,419 B1 * | 7/2001 | Schinzel ................ | B25J 9/023 294/119.1 |
| 6,609,044 B1 | 8/2003 | Basista et al. | |
| 6,621,045 B1 * | 9/2003 | Liu .................... | B23K 26/1435 219/121.7 |
| 6,841,034 B2 | 1/2005 | Zuehlke ............. | B29C 66/5344 156/379.8 |
| 7,131,361 B2 * | 11/2006 | Nakajima ................. | B23Q 7/04 83/100 |
| 7,899,575 B2 * | 3/2011 | Kilian .................. | B23K 26/38 700/186 |
| 7,992,475 B2 * | 8/2011 | Buettner ............ | B21D 35/003 83/25 |
| 8,826,787 B2 * | 9/2014 | Hoover ................ | B65H 3/0883 83/100 |
| 9,008,841 B2 * | 4/2015 | Fuhlbrigge ........... | B25J 9/1687 700/253 |
| 10,449,592 B2 * | 10/2019 | Mathias ................ | B21D 45/04 |
| 2002/0190435 A1 * | 12/2002 | O'Brien ............... | B23K 26/083 264/400 |
| 2004/0024485 A1 * | 2/2004 | McCoy ............. | B23K 26/0823 700/166 |
| 2004/0029362 A1 * | 2/2004 | Liu ..................... | B28D 5/0094 438/460 |
| 2004/0087112 A1 * | 5/2004 | Liu .................... | B23K 26/0853 438/460 |
| 2004/0118824 A1 * | 6/2004 | Burgess ............. | B23K 26/0853 219/121.71 |
| 2004/0202531 A1 * | 10/2004 | Beransky .......... | B23K 37/0408 414/331.18 |
| 2005/0067392 A1 * | 3/2005 | Nagai ................. | B23K 26/0622 219/121.72 |
| 2005/0072767 A1 * | 4/2005 | Leibinger .......... | B23K 37/0229 219/121.67 |
| 2006/0086703 A1 * | 4/2006 | Liu ........................ | B23K 26/38 219/121.72 |
| 2007/0199930 A1 * | 8/2007 | McElroy .............. | B23K 26/361 219/121.86 |
| 2007/0278191 A1 * | 12/2007 | Howerton ............ | H05K 3/0008 219/121.2 |
| 2008/0179304 A1 * | 7/2008 | Osako ................... | B23K 26/38 219/121.85 |
| 2009/0005898 A1 | 1/2009 | Kilian et al. | |
| 2009/0014425 A1 * | 1/2009 | Zuehlke ................ | C03B 33/091 219/121.72 |
| 2009/0050610 A1 * | 2/2009 | Takamatsu .......... | B28D 5/0011 219/121.72 |
| 2010/0122970 A1 * | 5/2010 | Caristan ............... | B25B 11/005 219/121.72 |
| 2010/0122971 A1 * | 5/2010 | Caristan ................ | B23K 26/38 219/121.72 |
| 2010/0236997 A1 * | 9/2010 | Varghese ................... | B07C 3/14 209/584 |
| 2010/0243617 A1 * | 9/2010 | Kosmowski ......... | H05K 3/0047 219/121.7 |
| 2011/0210110 A1 * | 9/2011 | Dearman ........... | B23K 37/0282 219/137 R |
| 2011/0266262 A1 * | 11/2011 | Denney ................. | G01J 3/0218 219/121.62 |
| 2013/0122687 A1 * | 5/2013 | Holden ............. | H01L 21/67092 438/462 |
| 2013/0270239 A1 * | 10/2013 | Wu .................... | B23K 26/0846 219/121.72 |
| 2014/0305917 A1 * | 10/2014 | Gadd ................... | B23K 26/142 219/121.72 |
| 2015/0020358 A1 * | 1/2015 | Wu ........................ | B25J 11/005 29/407.01 |
| 2015/0029485 A1 * | 1/2015 | Lafarre ................ | B23K 26/342 355/72 |
| 2015/0096964 A1 * | 4/2015 | Maeda .................... | B23K 26/53 219/121.84 |
| 2015/0224600 A1 * | 8/2015 | Spiess ................ | B23K 37/0408 219/121.71 |
| 2015/0239064 A1 * | 8/2015 | Osako ................ | B23K 26/0846 264/400 |
| 2015/0306653 A1 * | 10/2015 | Mathias ................. | B23K 26/38 83/103 |
| 2015/0360318 A1 * | 12/2015 | Aubry .................... | B23K 26/38 219/121.72 |
| 2016/0039049 A1 * | 2/2016 | Yang .................. | B23K 37/0408 219/121.72 |
| 2016/0184929 A1 * | 6/2016 | Staubli ............... | B23K 26/0846 219/121.64 |
| 2018/0281224 A1 * | 10/2018 | Grijalva, II .............. | B26D 7/27 |
| 2018/0370058 A1 * | 12/2018 | Fukada ............... | B23K 37/0408 |

FOREIGN PATENT DOCUMENTS

| | | |
|---|---|---|
| CN | 103111753 | 5/2013 |
| DE | 102014200208 B3 | 6/2015 |
| EP | 2008753 A1 | 12/2008 |
| WO | WO2014023323 A1 | 2/2014 |

OTHER PUBLICATIONS

International Preliminary Report on Patentability in International Application No. PCT/EP2016/062856, dated Dec. 19, 2017, 8 pages.
International Search Report from PCT Application No. PCT/EP2016/062856, dated Oct. 11, 2016, 6 pages.

* cited by examiner

UNLOADING A CUT-FREE WORKPIECE PART DURING MACHINING

CROSS REFERENCE TO RELATED APPLICATIONS

This application is a continuation of and claims priority under 35 U.S.C. § 120 from PCT Application No. PCT/EP2016/062856 filed on Jun. 7, 2016, which claims priority from German Application No. DE 10 2015 211 017.6, filed on Jun. 16, 2015. The entire contents of each of these priority applications are incorporated herein by reference.

TECHNICAL FIELD

The present invention relates to methods, machine, and computer program product for unloading a workpiece part by means of an unloading element having a vacuum sucker.

BACKGROUND

In machine tools with redundant axes, the desired position of a tool can be achieved as a result of different combinations of movements along the redundant axes. In these machines, for achieving a movement which is as dynamic as possible, an inert (heavy) coarse axis with large movement space for movement over the workpiece (a meter in the order of magnitude) is coupled with a (light) fine axis capable of high acceleration, with a small movement space (a few mm up to some 10 cm in the order of magnitude) for fast running down of fine contours. In sheet mover type laser cutting machines, in which both the workpiece and the laser machining head are moved along redundant axes, the movement of the sheet forms the coarse axis and the movement of the laser machining head forms the fine axis.

Known from EP 2 008 753 A1 is a laser cutting method in which both the workpiece and the laser beam are movable. In that method, workpiece and laser beam are moved along a common movement axis, and before cutting a workpiece part free, a switch is made into a (slave) machining mode in which only the laser beam is moved so that a cut free can be made with the sheet is at rest. In this case, a switch is made between the different modes after a control command of the machining program has been processed. This method has a disadvantage that during the switching the machine axes stop and when the laser is re-ignited in the slave machining mode, a start mark is created at the place of the cut edge, where the laser beam stopped in the master/slave machining mode.

Also known is a method for cutting free, by means of a laser beam, of a workpiece part already sucked on by a vacuum sucker. In this case, the machine axes stop before the workpiece part is cut free, and the workpiece part is then secured to the vacuum suction cup in order to prevent a tipping of the workpiece part during the subsequent cutting free of the workpiece part. During the final cut, the machine axes and the automation axes of the vacuum suction cup are then moved synchronously, wherein the highly dynamic machine axes, however, can only move slowly in accordance with the maximum speed of the automation axes.

SUMMARY

By way of contrast, it is one object of the invention to provide a method for unloading a workpiece part by means of an unloading element, to enable the unloading of the cut free workpiece part without a time delay and consequently to enable a higher level of productivity. Laser cutting machine and computer program product for carrying out the method are also disclosed.

This object is achieved by a method for the unloading of a workpiece part in parallel with processing time, by means of an unloading element, for example a vacuum sucker. In some implementations, the workpiece part is cut from a plate-form workpiece by means of a laser beam that moves on the workpiece at least along a first movement axis. In some implementations, the laser beam's movement relative to the workpiece is divided into a movement (main axis) of the workpiece and a movement (auxiliary axis) of the laser beam. In some examples, before executing an end cut (final cut) that separates the workpiece part from the workpiece, the workpiece is decelerated until standstill and the end cut is then executed by moving the laser beam.

In a first implementation, the unloading element is fixed on the not yet cut free workpiece part at the earliest when the workpiece comes to a standstill. In this implementation, the unloading element may be fixed on the cut free workpiece part at the latest at the end of the executed final cut.

In a second implementation, the unloading element is lowered in a direction toward the workpiece part at the latest at the end of the executed final cut, without clamping on said workpiece part in the process. In this implementation, the workpiece together with the cut free workpiece part therein and the unloading element, which is located above the cut free workpiece part, may be displaced laterally together into a withdrawal position. In some examples, in the withdrawal position, the unloading element is fixed on the cut free workpiece part.

In a third implementation, the unloading element is decelerated synchronously with the workpiece until standstill at least along the first movement axis without movement relative to the workpiece. In this implementation, the unloading element may be fixed on the not yet cut free workpiece part at the latest when the workpiece comes to a standstill.

In some implementations, the laser beam movement relative to the workpiece can be divided into a movement of the workpiece and a movement of the laser beam along a second movement axis.

In some implementations, the main axis of the workpiece is decelerated until standstill and the auxiliary axis of the laser beam is accelerated in parallel. The switching from a machining mode (e.g. master/slave mode), in which workpiece and laser beam are moved along a common movement axis, into a machining mode (e.g. slave mode), in which only the laser beam is moved, is carried out without a break in time. In some implementations, during the switching process onto the auxiliary axis, the main axis may reduce its speed to zero. In some implementations, the auxiliary axis increases its speed to the cutting speed so that the resulting speed remains constant.

In some examples of the first implementation, during the decelerating of the main axis, an automation moves its unloading elements (e.g. vacuum sucker, magnets, electro-adhesion grippers, etc.) in the direction of the workpiece (e.g. metal sheet). A vacuum sucker can come into contact with the workpiece shortly before the standstill of the main axis and can start to create a vacuum. In some examples, the vacuum sucker may not be firmly attached by suction before the standstill of the main axis to the extent that it could be damaged by the movement of the main axis. In some examples, other retaining elements contact and grip the stationary workpiece only after the standstill of the main axis so that it is not scratched. In some examples, at the latest when the auxiliary axis has cut free the workpiece, the unloading element grips the workpiece part (sufficient vacuum may then built up in the vacuum sucker for carrying the workpiece) so that it does not tip and can be unloaded without a time delay.

In some examples of the second implementation, the cut free workpiece, by lateral displacement of the remaining workpiece, is brought into a withdrawal position that is better for the removal of the workpiece part. In the withdrawal position the workpiece part may be pressed out in an upward direction so that it can be withdrawn without any problem independently of the remaining workpiece.

In some examples of the third implementation, with no movement relative to the workpiece, the unloading element is decelerated synchronously with the workpiece until standstill. In some examples, the workpiece may move synchronously with the workpiece even before the decelerating. In some examples, during the synchronous deceleration or movement, the unloading element is lowered onto the workpiece part that is to be cut free. In some examples, a vacuum sucker is lowered onto the workpiece and the buildup of the vacuum is started. In some examples, the unloading element can be moved synchronously with the workpiece without movement relative to said workpiece before the decelerating, and can be laid on the workpiece part in order to thereby stabilize the workpiece part in the plane of the workpiece before the unloading element fixes the workpiece part, for example, after the standstill of the workpiece. In this way, the effect of the workpiece part tipping out of the workpiece plane may be prevented. Fixing the workpiece part only after the standstill of the workpiece may reduce demands for accuracy of the synchronous movements of the main axis and of the unloading element. In some examples, the unloading element stops as soon as the main axis stops. In some examples, a vacuum buildup on the unloading element may finish exactly when the workpiece part is cut free by the laser beam on the auxiliary axis. In some examples, the vacuum sucker may require a longer time to suck onto the workpiece part than the auxiliary axis needs for the final cut.

In some implementations, for example according to the first or third implementations, at the end of the final cut, that is to say with the workpiece part cut free, the unloading element can move away from the remaining workpiece in the Z-direction simultaneously with the laser cutting head moving. For example, the workpiece part can be positioned for the next machining without a time break attributable to the removal of parts.

In some implementations, for example according to the first implementation, the unloading element is activated by its activation time at the earliest before the standstill of the workpiece and at the latest before the end of the executed final cut. In some examples with vacuum suckers, the activation time may be provided by the duration needed for building up sufficient vacuum in the vacuum sucker for carrying the workpiece.

In some implementations, for example according to the first implementation, the unloading element is positioned at the eventual position of the cut free workpiece part before being activated. In some examples, shortly before or at the same time with the decelerating of the main axis, the unloading element is lowered in the Z-direction from a transfer height of for example 25 mm onto the workpiece surface. During a further machining by the auxiliary axis the vacuum buildup can then be carried out.

In some implementations, for example according to the third implementation, the unloading element may be activated by at least its activation time before the standstill of the workpiece, especially before commencement of the decelerating of the workpiece. In some examples with vacuum suckers, the activation time is provided by the duration until sufficient vacuum has built up in the vacuum sucker for carrying the workpiece.

In some implementation, for example according to the third implementation, the unloading element is lowered during the synchronous movement with the workpiece in the direction toward said workpiece to an interaction height. In some examples with vacuum suckers, the vacuum sucker is seated on the eventual workpiece part and the vacuum buildup is started.

In some implementations, the laser beam movement relative to the workpiece along two movement axes is divided into a movement of the workpiece and a movement of the laser beam. In some examples, for example according to the third implementation, the unloading element is moved synchronously with the workpiece along the two movement axes without movement relative to said workpiece and decelerated until standstill. In some examples, during the synchronous movement the unloading element is fixed on the not yet cut free workpiece part.

In some implementations, for example according to the second implementation, the unloading element is preferably lowered in the direction toward the not yet cut free workpiece part at the earliest at the standstill of the workpiece, without clamping on said workpiece part in the process. The unloading element which is arranged above the workpiece part may limit the tipping of the cut free workpiece part in relation to the remaining workpiece. In some examples, the unloading element may be lowered onto a distance of the workpiece that may be smaller than the workpiece thickness. In some examples, the unloading element may be arranged closely above the workpiece part so that the cut free workpiece part cannot tip to the extent that it could completely emerge from the plane of the metal sheet. The workpiece element may continue to be retained in the remaining workpiece between workpiece support, on which the workpiece lies, and the unloading element, but still not fixed on the unloading element. In some examples, the unloading element is lowered until resting on the workpiece part, without clamping on said workpiece part in the process.

In some implementations, the movement of the laser beam may be accelerated before the executing of the final cut and as the movement of the workpiece is decelerated, so that the resulting cutting speed remains constant and no start marks are created on the cut edge.

In a further aspect, the invention also relates to a laser cutting machine for the laser cutting of a workpiece part from, for example, a plate-form workpiece by means of a laser beam. The machine may comprise a main drive for moving the workpiece at least along a first movement axis, an auxiliary drive for moving a laser machining head which directs the laser beam onto the workpiece at least along the first movement axis, or for moving a deflection optical device which deflects the laser beam onto the workpiece part at least along the first movement axis, an unloading element (e.g. having a vacuum sucker) which can be lowered and lifted relative to the workpiece, for unloading the cut free workpiece part, and a machine control unit programmed to implement the disclosed method, for example, to correspondingly actuate the drives of the laser cutting machine.

In some implementations, the laser cutting machine additionally comprises a drive for moving the unloading element at least along the first movement axis.

The disclosure finally relates to a computer program product comprising instructions for implementing the methods of this disclosure when the product runs on the machine control unit of the laser cutting machine.

Further advantages of the invention are gathered from the claims, from the description and from the drawings. The above-mentioned features and the further quoted features can also be used separately in each case or in multiples in any combinations. The shown and described embodiments are not to be understood as a final list but rather to have exemplary characters for the description of the invention.

DETAILED DESCRIPTION

In the following figure description, identical reference signs are used for the same, or functionally the same, components.

Figure 1:
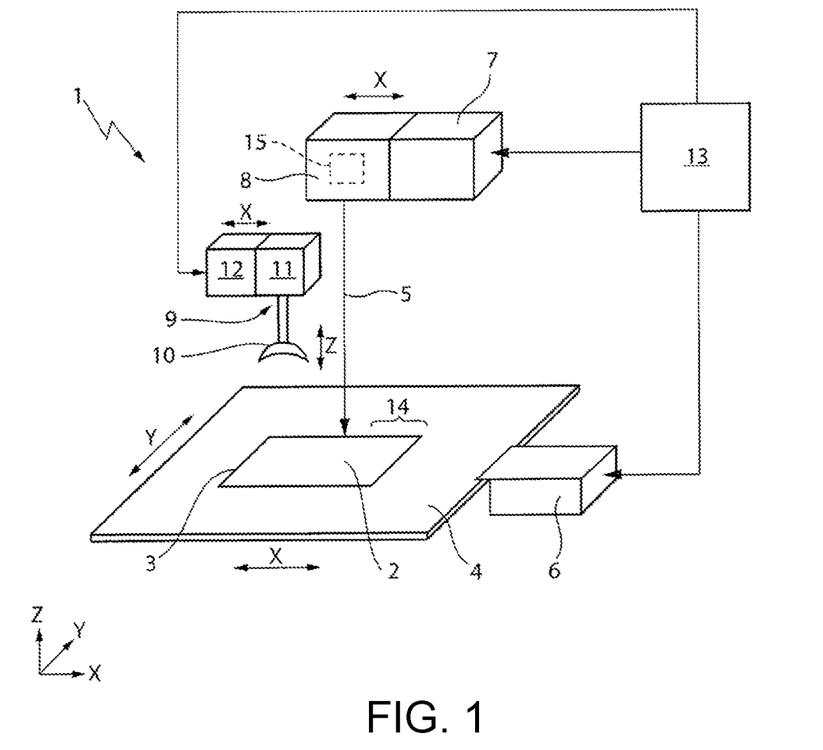
FIG. 1 shows a laser cutting machine.

The laser cutting machine 1 shown in FIG. 1 serves for the laser cutting of workpiece parts (e.g. metal sheet parts) 2 along a desired path 3 from a plate-form workpiece (e.g. metal sheet) 4 by means of a laser beam 5.

The laser cutting machine 1 comprises a workpiece drive ("main drive") 6 for moving the workpiece 4 in the X-Y plane along the X-axis and Y-axis, and a laser cutting head drive ("auxiliary drive") 7 for moving a laser cutting head 8, which directs the laser beam 5 onto the workpiece 4, along the X-axis. The laser beam 5 is created by a laser beam generator, e.g. a solid-state laser, not shown in FIG. 1, and fed to the laser cutting head 8. The workpiece 4 lies on a workpiece support (not shown) in the XY plane.

The laser cutting machine 1 also comprises an unloading device 9 with an unloading element designed as a vacuum sucker 10 for withdrawing a cut free workpiece part 2 and with a Z-drive 11 for lowering and lifting the vacuum sucker 10 relative to the workpiece 4 or to the workpiece support. The unloading device 9 itself can be moved in the X-direction by means of an X-drive 12.

Figure 2:
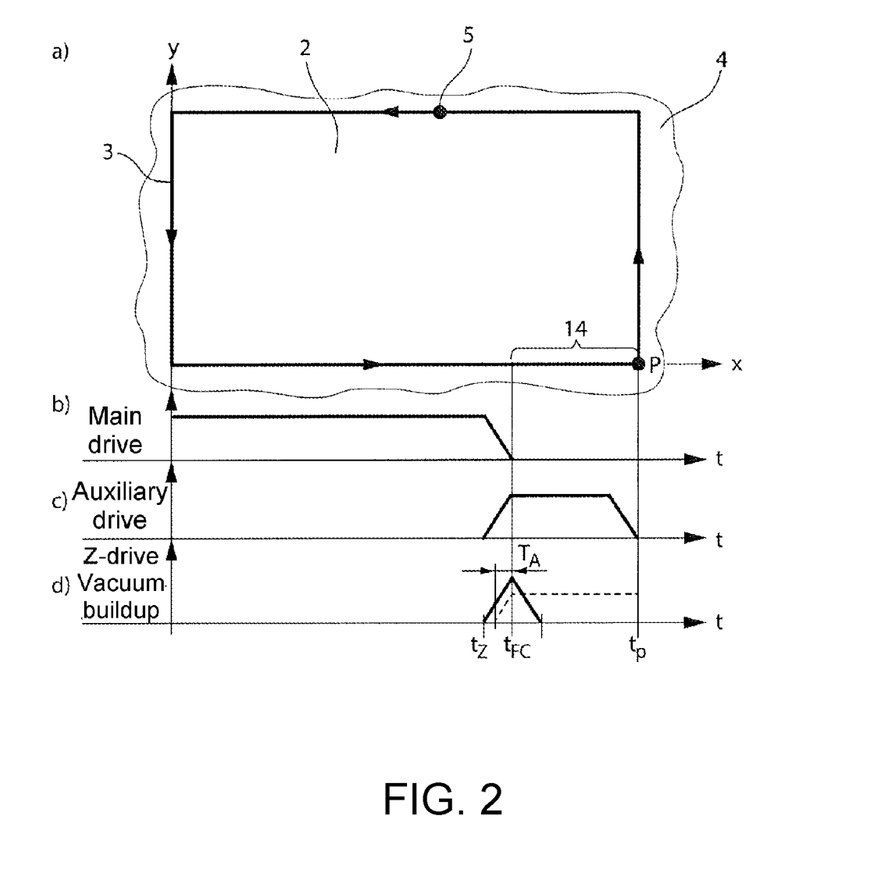
FIG. 2 shows a first variant of the method for unloading of a cut free workpiece part in parallel with processing time.
Figure 3:
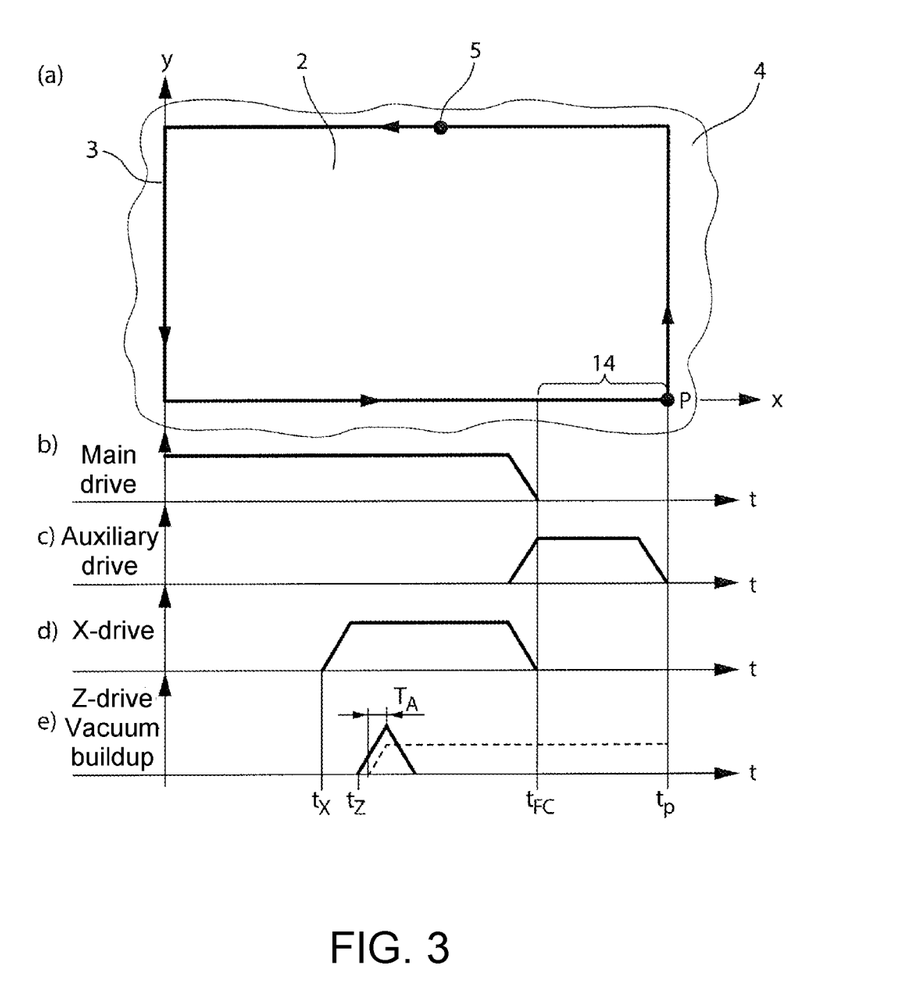
FIG. 3 shows a second variant of the method for unloading of a cut free workpiece part in parallel with processing time.
Figure 4:
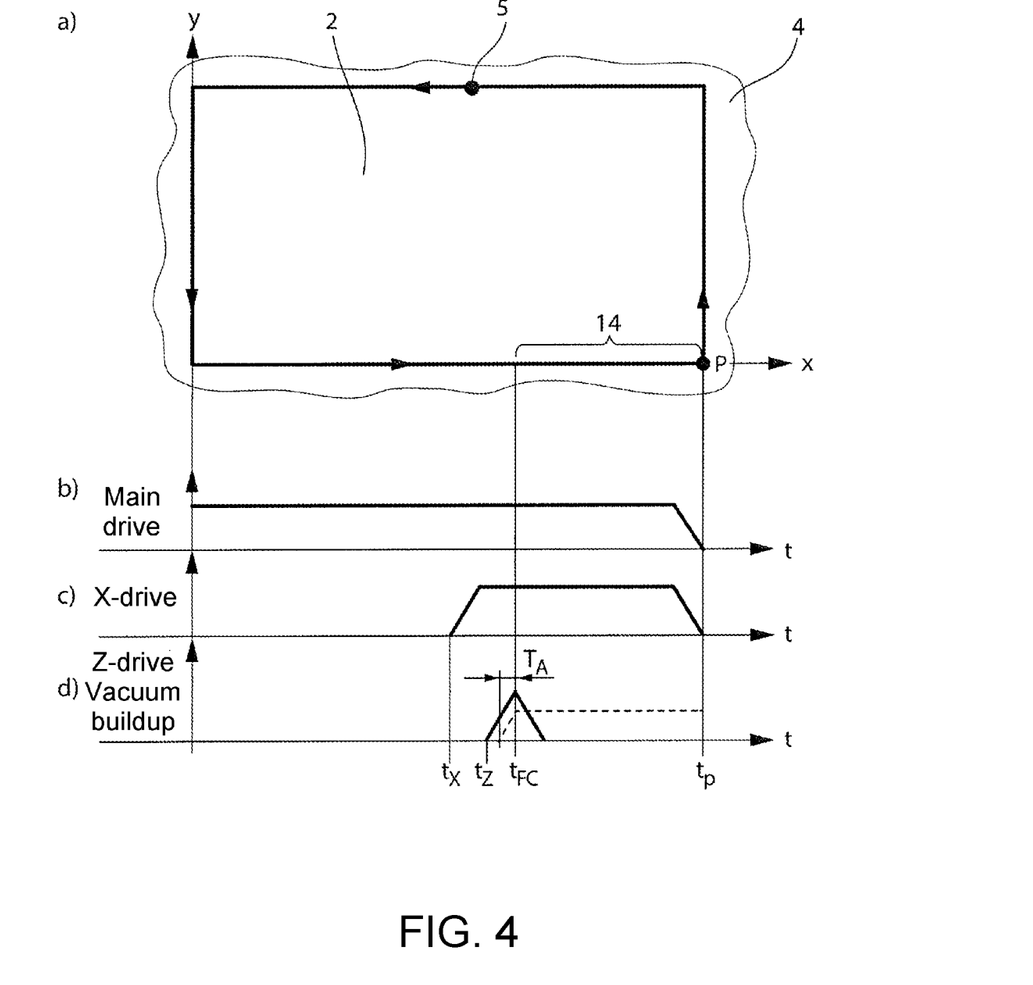
FIG. 4 shows a third variant of the method for unloading of a cut free workpiece part in parallel with processing time.

The laser cutting machine 1 furthermore comprises a machine control unit 13, actuating the individual drives 6, 7, 11, 12, which can additionally also divide the desired movement of the laser beam 5 on the workpiece 4 along the X-axis into a movement of the workpiece 4 by means of the main drive 6 and a movement of the laser beam 5 by means of the auxiliary drive 7. Before executing an end cut ("final cut") 14 which separates the workpiece part 2 from the workpiece 4, the workpiece 4 is first decelerated by means of the main drive 6 until standstill at time point $t_{FC}$ (FIGS. 2-4). The final cut 14 is then executed only by moving the laser beam 5 by means of the auxiliary drive 7.

Shown in FIGS. 2a to 2d is a first method variant for the unloading of a cut free workpiece part 2 in parallel with processing time.

FIG. 2a shows the movement of the laser beam 5 on the workpiece 4 in the X-direction and Y-direction in order to cut the workpiece part 2. The laser beam 5 begins at the point P and travels down the closed desired path 3, as indicated by arrows, in the anticlockwise direction and at the end of the desired path 3 executes the final cut 14 in the X-direction which separates the workpiece part 2 from the workpiece 4. Shortly before the final cut 14, the laser beam 5 is moved on the workpiece 4 just by the movement of the workpiece 4 by means of the main drive 6. Alternatively, for accelerating the cutting process, a fast change of direction of the desired path 3 would not be carried out solely by the movement of the workpiece part 4 by means of the main drive 6 but also by a movement of the laser cutting head 8 by means of the auxiliary drive 7.

FIGS. 2b, 2c show the time actuation of the main drive 6 in the X-axis (FIG. 2b) and of the auxiliary drive 7 in the X-axis (FIG. 2c), in each case along the lower section of the desired path 3 which in FIG. 2a extends along the X-axis. As shown in FIG. 2b, shortly before executing the X-parallel final cut 14 the main drive 6 is decelerated in the X-direction until standstill and at the same time the auxiliary drive 7 is accelerated (FIG. 2c) so that with the main drive 6 stationary, that is to say with the workpiece 4 at rest, the final cut 14 is executed only by moving the laser beam 5 by means of the auxiliary drive 7. During this switching process from main drive to auxiliary drive the auxiliary drive 7 increases its speed as the main drive 6 reduces its speed, as a result of which the resulting cutting speed remains constant.

FIG. 2d shows as a continuous line the time actuation of the Z-drive 11 and also, as a dashed line, the vacuum buildup in the vacuum sucker 10 along the lower section of the desired path 3 which in FIG. 2a extends along the X-axis. During the machining, the vacuum sucker 10 is first positioned at a distance (e.g. approximately 110 mm) of the workpiece 4 and then at the time point $t_Z$ ($t_Z<t_{FC}$) is lowered onto the workpiece surface before the standstill of the main drive 6 or the workpiece 4 at the eventual position of the cut free workpiece part 2 on the workpiece support (not shown). The buildup of the vacuum in the vacuum sucker 10 is started by the activation time $T_A$, which is required for the buildup of the vacuum in the vacuum sucker 10, at the earliest before the time point $t_{FC}$, and at the latest before the end of executing the final cut 14. Accordingly, the vacuum sucker 10, at the earliest at the standstill of the workpiece 4, is fixed on the not yet cut free workpiece part 2, or at the latest at the end of the executed final cut 14, is then fixed on the just cut free workpiece part 2. In the shown exemplary embodiment, the Z-drive 11, for increasing the cutting speed of the auxiliary drive 7, is simultaneously actuated so that at the time point $t_{FC}$ the vacuum sucker 10 is fixed on the not yet cut free workpiece part 2. At the end of the cut (time point $t_P$), the vacuum sucker 10 together with the workpiece part 2 can move away from the workpiece 4 simultaneously with the laser cutting head 8 in the Z-direction and the workpiece 4 can be positioned for the next machining without a time break attributable to the removal of parts. The interfering contour of the laser cutting head 8 and an associated beam guard are designed so that the unloading device 9 comes as close as possible to the cutting contour in order to be able to withdraw even very small workpiece parts in an oriented manner.

Shown in FIGS. 3a to 3e is a second method variant for the unloading of a cut free workpiece part 2 in parallel with processing time.

FIG. 3a again shows the movement of the laser beam 5 on the workpiece 4 in the X-direction and Y-direction in order to cut the workpiece part 2. As in the first method variant, shortly before executing the X-parallel final cut 14 (time point $t_{FC}$) the main drive 6 is decelerated until standstill in the X-direction (FIG. 3b) and at the same time the auxiliary drive 7 is correspondingly accelerated (FIG. 3c). Only at the standstill of the main drive 6, that is to say with the workpiece 4 at rest, the final cut 14 is executed only by moving the laser beam 5 by means of the auxiliary drive 7.

As shown in FIG. 3d, during the machining the vacuum sucker 10, by means of the X-drive 12, is accelerated at time point $t_X$ ($t_X<t_{FC}$) to the speed of the main drive 6 and then, without movement relative to the workpiece 4, is moved synchronously with the workpiece 4 in the X-axis and decelerated until standstill. While the vacuum sucker 10 moves synchronously with the workpiece 4, at the time point $t_Z$ ($t_X<t_Z<t_{FC}$) the Z-drive 11 is actuated (FIG. 3e) in order to lower the vacuum sucker 10 onto the workpiece surface at the eventual position of the cut free workpiece part 2 above the moving workpiece 4. As shown further in FIG. 3e, at the same time as, or almost at the same time as, the lowering, the buildup of the vacuum in the vacuum sucker 10 is also started so that the vacuum sucker 10 is fixed on the not yet cut free workpiece part 2 just before the decelerating of the main drive 6. The vacuum sucker 10 can also be fixed on the not yet cut free workpiece part 2 during the decelerating, wherein the vacuum buildup in the vacuum sucker 10 then has to be started by the activation time $T_A$, which is required for the buildup of the vacuum in the vacuum sucker 10, before the time point $t_{FC}$ so that the vacuum sucker 10 is fixed on the just cut free workpiece part 2 at the latest at the standstill of the workpiece 4. At the end of the cut (time point $t_P$), the vacuum sucker 10 together with the workpiece part 2 can move away from the workpiece 4 in the Z-direction simultaneously with the laser cutting head 8, and the workpiece 4 can be positioned for the next machining without a time break attributable to the removal of parts.

Instead of moving the laser beam 5 in the X-direction by moving the laser cutting head 8, as described above, it is alternatively also possible to move the laser beam 5 on the workpiece 4 in the X-direction via a deflection optical device 15 (FIG. 1) which is integrated in the laser cutting head 8 and can be deflected by means of the auxiliary drive 7 and can be designed for example as a pivotable scanner mirror.

Shown in FIGS. 4a to 4d is a third method variant for the unloading of a cut free workpiece part 2 in parallel with processing time.

FIG. 4a again shows the movement of the laser beam 5 on the workpiece 4 in the X-direction and Y-direction in order to cut the workpiece part 2. Unlike in the first and second method variants, there is no auxiliary drive here so that the movement of the laser beam 5 on the workpiece 4 is carried out just by the movement of the workpiece 4 by means of the main drive 6.

As shown in FIG. 4b, the main drive 6 is decelerated until standstill in the X-direction before the end of the X-parallel final cut 14. At the standstill of the main drive 6, the final cut 14 is completed, and the workpiece part 2 is cut free.

As shown in FIG. 4c, during the machining the vacuum sucker 10, by means of the X-drive 12, is accelerated to the speed of the main drive 6 at the time point $t_X$ ($t_X<t_{FC}$) and then, without movement relative to the workpiece 4, is moved synchronously with the workpiece 4 in the X-axis and decelerated until standstill. As soon as the vacuum sucker 10 moves synchronously with the workpiece 4, the Z-drive 11 is actuated at the time point $t_Z$ ($t_X<t_Z<t_{FC}$) (FIG. 4d) in order to lower the vacuum sucker 10 onto the workpiece surface at the eventual position of the cut free workpiece part 2 above the moving workpiece 4. As shown further in FIG. 4d, at the same time as, or almost at the same time as, the lowering the buildup of the vacuum in the vacuum sucker 10 is also started so that the vacuum sucker 10 is fixed on the not yet cut free workpiece part 2 before the decelerating of the main drive 6. The vacuum sucker 10 can also be fixed on the not yet cut free workpiece part 2 during the decelerating, such that the vacuum buildup in the vacuum sucker 10 has then to be started by the activation time $T_A$, which is necessary for the buildup of the vacuum in the vacuum sucker 10, before the end of the cut or before the standstill of the main drive 6 so that the vacuum sucker 10 is fixed on the workpiece part 2 at the latest at the standstill of the workpiece 4. At the end of the cut (time point $t_P$), the vacuum sucker 10 together with the workpiece part 2 can move away from the workpiece 4 in the Z-direction simultaneously with the laser cutting head 8, and the workpiece 4 can be positioned for the next machining without a time break attributable to the removal of parts.

Figure 5:
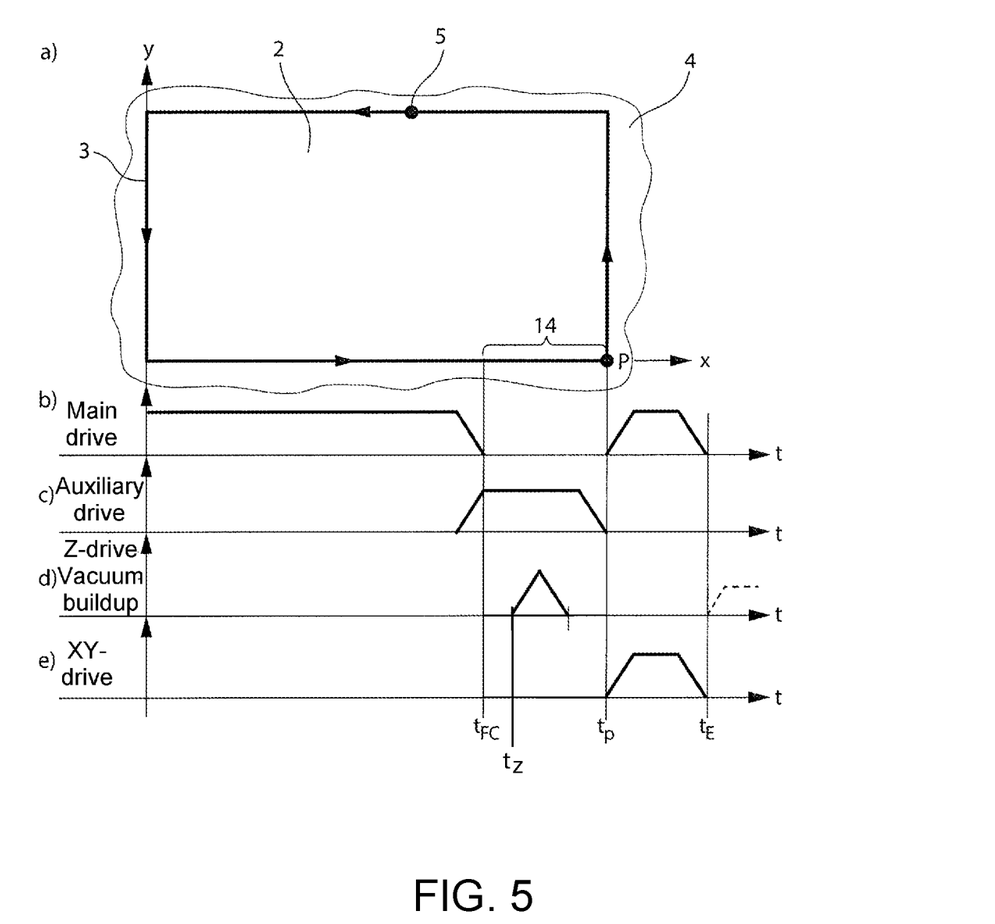
FIG. 5 shows a fourth variant of the method for unloading of a cut free workpiece part in parallel with processing time.

Shown in FIGS. 5a to 5e is a fourth method variant for the unloading of a cut free workpiece part 2 in parallel with processing time. The fourth method variant differs from the first method variant shown in FIGS. 2a to 2d by the following features:

At a time point $t_Z$ ($t_{FC}\leq t_Z \leq t_P$), which lies between the start ($t_{FC}$) and the end $t_P$ of the final cut 14, the vacuum sucker 10 is lowered in the direction toward the workpiece part 2 without clamping on said workpiece part 2 in the process. The vacuum sucker 10 is therefore only lowered if the workpiece part 2 is at rest. Alternatively, the vacuum sucker 10 can also be lowered in the direction toward the workpiece part 2 with the workpiece part 2 still in motion. In particular, in this case the vacuum sucker 10 may be seated free of force on the workpiece part 2 only when the workpiece part 2 is at rest.

After completion of the final cut 14, both the workpiece 4 together with the cut free workpiece part 2 therein, by means of the main drive 6, and the vacuum sucker 10, located above the cut free workpiece part 2, by means of an X-Y drive shown in FIG. 5e, are laterally (i.e. in X-Y-plane) displaced (time point $t_E$) together into a withdrawal position that is better suited for the removal of the workpiece part 2 from the remaining workpiece 4. The vacuum buildup in the vacuum sucker 10, as is indicated by the dashed line in FIG. 5d, is only then carried out in order to fix the unloading element 10 on the cut free workpiece part 2. In the withdrawal position, the workpiece part 2 can be pressed out of the remaining workpiece 4 by pins in the upward direction so that only the workpiece part 2 and not also the remaining workpiece 4 is sucked on by the vacuum sucker 10.

In order to prevent the effect of the cut free workpiece part 2 tipping or sliding under or over the remaining workpiece, as a result of the lateral displacement, the vacuum sucker 10 is lowered onto the workpiece part 2, such that it saves for a distance smaller than the workpiece thickness. Consequently, the cut free workpiece part 2 continues to be retained in the remaining workpiece 4 between a workpiece support (e.g. support brushes) and the vacuum sucker 10 but is not yet fixed on the unloading element. Alternatively, the vacuum sucker 10 can also be lowered until being seated in a force free manner on the workpiece part 2 but without clamping on the workpiece part 2 in the process.

As soon as the cut free workpiece part 2 begins to tip, the upwardly tipping section of the workpiece part 2 presses the vacuum sucker 10 upward against its weight and spring force, and the downwardly tipping section of the workpiece part 2 presses the workpiece support (e.g. formed by support brushes) against its spring force downward so that restoring forces are created which hold the workpiece part 2 inside the remaining workpiece 4.

What is claimed is:

1. A method of cutting and unloading a workpiece part from a workpiece that is plate-form, the method comprising:
   applying a laser beam to cut the workpiece part leaving the workpiece part connected to the workpiece by a main drive, wherein the laser beam has a movement relative to the workpiece at least along a first movement axis (X), the movement relative to the workpiece comprises a movement of the workpiece and a movement of the laser beam;
   executing a final cut that separates the workpiece part from the workpiece by moving only the laser beam, wherein before executing the final cut, the workpiece is decelerated until standstill; and
   unloading the workpiece part by an unloading element having a vacuum sucker that is operated during cutting of the workpiece;
   wherein the unloading element is operated according to an operation selected from the group of operations consisting of:
   (1) fixing the unloading element on the workpiece part, no earlier than the standstill of the workpiece, and no later than a completion of executing the final cut,
   (2) no later than completion of executing the final cut, lowering the unloading element in a direction toward the workpiece part without clamping on the workpiece part, and no earlier than at completion of executing the final cut, laterally displacing the unloading element, which is located above the workpiece part, along with the workpiece and the workpiece part therein, into a withdrawal position such that at the withdrawal position the unloading element is fixed on the workpiece part, and
   (3) decelerating the unloading element synchronously with the workpiece until standstill at least along the first movement axis (X) without an unloading element movement relative to the workpiece, such that the unloading element is fixed on the workpiece part no later than at the standstill of the workpiece.

2. The method of claim 1, wherein the laser beam movement relative to the workpiece further comprises a movement of the workpiece and a movement of the laser beam along a second movement axis (Y).

3. The method of claim 1, wherein operation of the unloading element via a machine control unit comprises operation sequence (1), and wherein the unloading element is activated by its activation time (TA) no earlier than before the standstill of the workpiece and no later than before completion of executing the final cut.

4. The method of claim 1, wherein operation of the unloading element via a machine control unit comprises operation sequence (1), and wherein before activation of the unloading element the unloading element is positioned at an eventual position of the workpiece part and is then lowered in a direction (Z) toward the workpiece to an interaction height.

5. The method of claim 1, wherein operation of the unloading element via a machine control unit comprises operation sequence (3), and wherein before decelerating, the unloading element is moved synchronously with the workpiece without movement relative to said workpiece while being fixed on the workpiece part no later than completion of executing the final cut.

6. The method of claim 1, wherein operation of the unloading element via a machine control unit comprises operation sequence (3), and wherein before decelerating the unloading element is moved synchronously with the workpiece without movement relative to said workpiece and is laid on the workpiece part to stabilize the workpiece part in the plane of the workpiece before being fixed to the workpiece part after the standstill of the workpiece.

7. The method of claim 1, wherein operation of the unloading element via a machine control unit comprises operation sequence (3), and wherein the unloading element is activated at least by its activation time (TA) before deceleration of the workpiece commences.

8. The method of claim 1, wherein operation of the unloading element via a machine control unit comprises operation sequence (3), and wherein during the synchronous movement with the workpiece, the unloading element is lowered in the direction toward the workpiece up to an interaction height.

9. The method of claim 2, wherein operation of the unloading element via a machine control unit comprises operation sequence (3), and wherein the unloading element is decelerated synchronously with the workpiece until standstill along two movement axes (X, Y) without movement relative to the workpiece, and is fixed on the workpiece part no later than completion of executing the final cut.

10. The method of claim 1, wherein operation of the unloading element via a machine control unit comprises operation sequence (2), and wherein the unloading element is lowered no earlier than the standstill of the workpiece in the direction toward the workpiece part without clamping on the workpiece part.

11. The method of claim 1, wherein operation of the unloading element via a machine control unit comprises operation sequence (2), and wherein the unloading element is lowered to a distance from the workpiece part, the distance being smaller than workpiece thickness.

12. The method of claim 11, wherein the unloading element is lowered until resting on the workpiece part.

13. The method of claim 1, wherein operation of the unloading element via a machine control unit comprises operation sequence (2), and further comprising:
   lifting the workpiece part from the remaining workpiece from a lower surface of the workpiece part; and
   fixing the unloading element on lifted workpiece part at the withdrawal position.

14. The method of claim 1, wherein before executing the final cut the movement of the laser beam is accelerated as the movement of the workpiece is decelerated.

15. A laser cutting machine for cutting of a workpiece part from a workpiece that is plate-form, the machine comprising:
   a main drive for moving the workpiece at least along a first movement axis;
   an auxiliary drive for moving at least one of a laser machining head that directs a laser beam onto the workpiece and a deflection optical device that deflects the laser beam onto the workpiece, at least along the first movement axis;
   an unloading element for unloading the workpiece part, the unloading element has a vacuum sucker and is movable to be lowered and lifted relative to the workpiece; and
   a machine control unit programmed to implement a method of cutting and unloading a workpiece part from a workpiece that is plate-form, the method comprising:

applying a laser beam to cut the workpiece part leaving the workpiece part connected to the workpiece by a main drive, wherein the laser beam has a movement relative to the workpiece at least along a first movement axis (X), the movement relative to the workpiece comprises a movement of the workpiece and a movement of the laser beam;

executing a final cut that separates the workpiece part from the workpiece by moving only the laser beam, wherein before executing the final cut, the workpiece is decelerated until standstill; and unloading the workpiece part by an unloading element having a vacuum sucker that is operated during cutting of the workpiece;

wherein the unloading element is operated according to an operation selected from the group of operations consisting of:
  (1) fixing the unloading element on the workpiece part, no earlier than the standstill of the workpiece, and no later than a completion of executing the final cut,
  (2) no later than completion of executing the final cut, lowering the unloading element in a direction toward the workpiece part without clamping on the workpiece part, and no earlier than at completion of executing the final cut, laterally displacing the unloading element, which is located above the workpiece part, along with the workpiece and the workpiece part therein, into a withdrawal position such that at the withdrawal position the unloading element is fixed on the workpiece part, and
  (3) decelerating the unloading element synchronously with the workpiece until standstill at least along the first movement axis (X) without an unloading element movement relative to the workpiece, such that the unloading element is fixed on the workpiece part no later than at the standstill of the workpiece.

16. The laser cutting machine of claim 15, further comprising a drive configured to move the unloading element at least along the first movement axis.

17. A non-transitory computer program product, comprising instructions that when executed by one or more machine control units of a laser cutting machine, causes the one or more machine control units to perform a method of cutting and unloading a workpiece part from a workpiece that is plate-form, comprising:

applying a laser beam to cut the workpiece part leaving the workpiece part connected to the workpiece by a main drive, wherein the laser beam has a movement relative to the workpiece at least along a first movement axis (X), the movement relative to the workpiece comprising a movement of the workpiece and a movement of the laser beam;

executing a final cut that separates the workpiece part from the workpiece by only moving only the laser beam, wherein before executing the final cut, the workpiece is decelerated until standstill; and unloading the workpiece part by an unloading element having a vacuum sucker that is operated during cutting of the workpiece;

wherein the unloading element is operated according to an operation selected from the group of operations consisting of:
  (1) fixing the unloading element on the workpiece part, no earlier than the standstill of the workpiece, and no later than a completion of executing the final cut,
  (2) no later than completion of executing the final cut, lowering the unloading element in a direction toward the workpiece part without clamping on the workpiece part, and no earlier than at completion of executing the final cut, laterally displacing the unloading element, which is located above the workpiece part, along with the workpiece and the workpiece part therein, into a withdrawal position such that at the withdrawal position the unloading element is fixed on the workpiece part, and
  (3) decelerating the unloading element synchronously with the workpiece until standstill at least along the first movement axis (X) without an unloading element movement relative to the workpiece, such that the unloading element is fixed on the workpiece part no later than at the standstill of the workpiece.

\* \* \* \* \*